March 28, 1961  H. H. BUCHTER  2,977,140
SEAL FOR AGITATORS IN PRESSURE VESSELS
Filed June 14, 1957  4 Sheets-Sheet 1
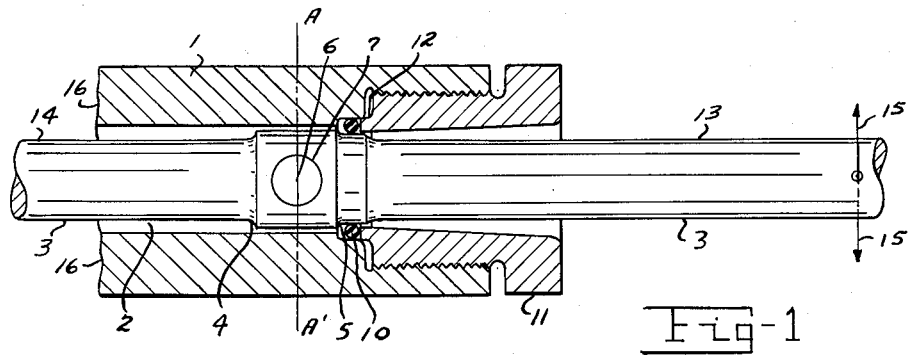
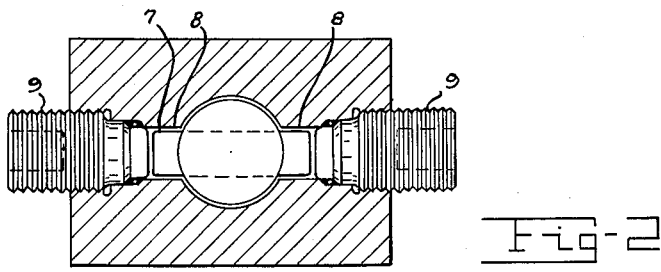
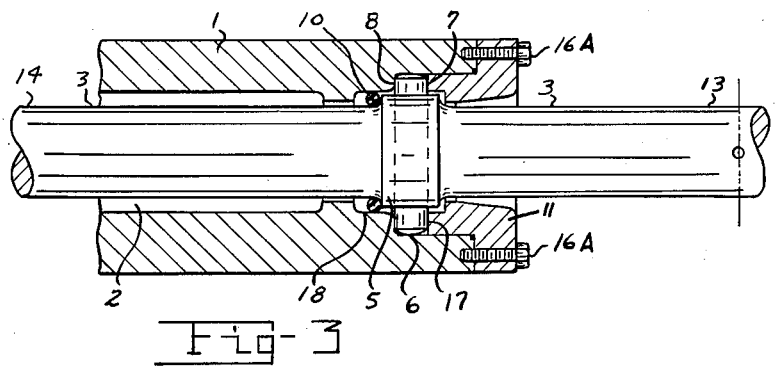
INVENTOR.
HUGO H. BUCHTER
BY
Herman O. Bauermeister
ATTORNEY

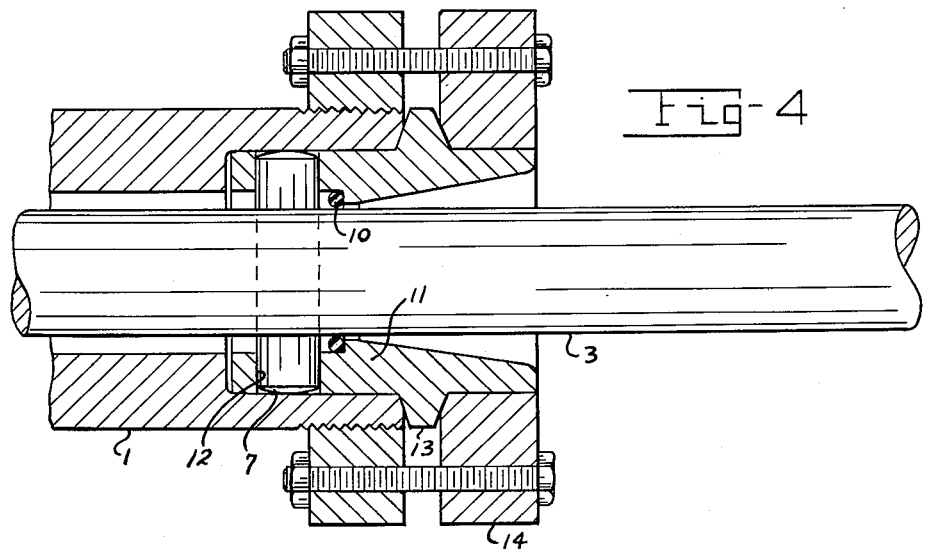
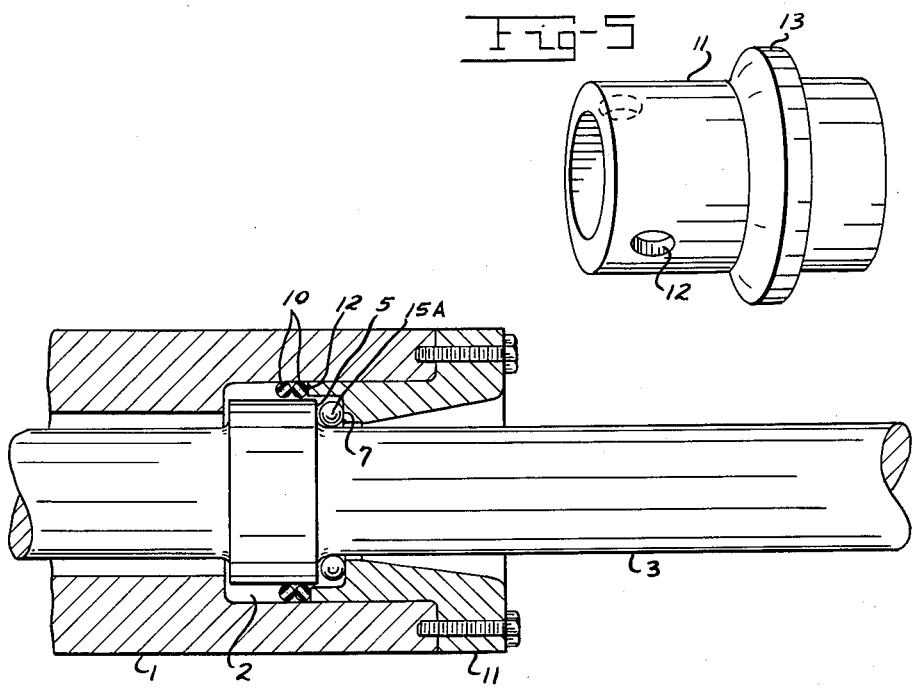

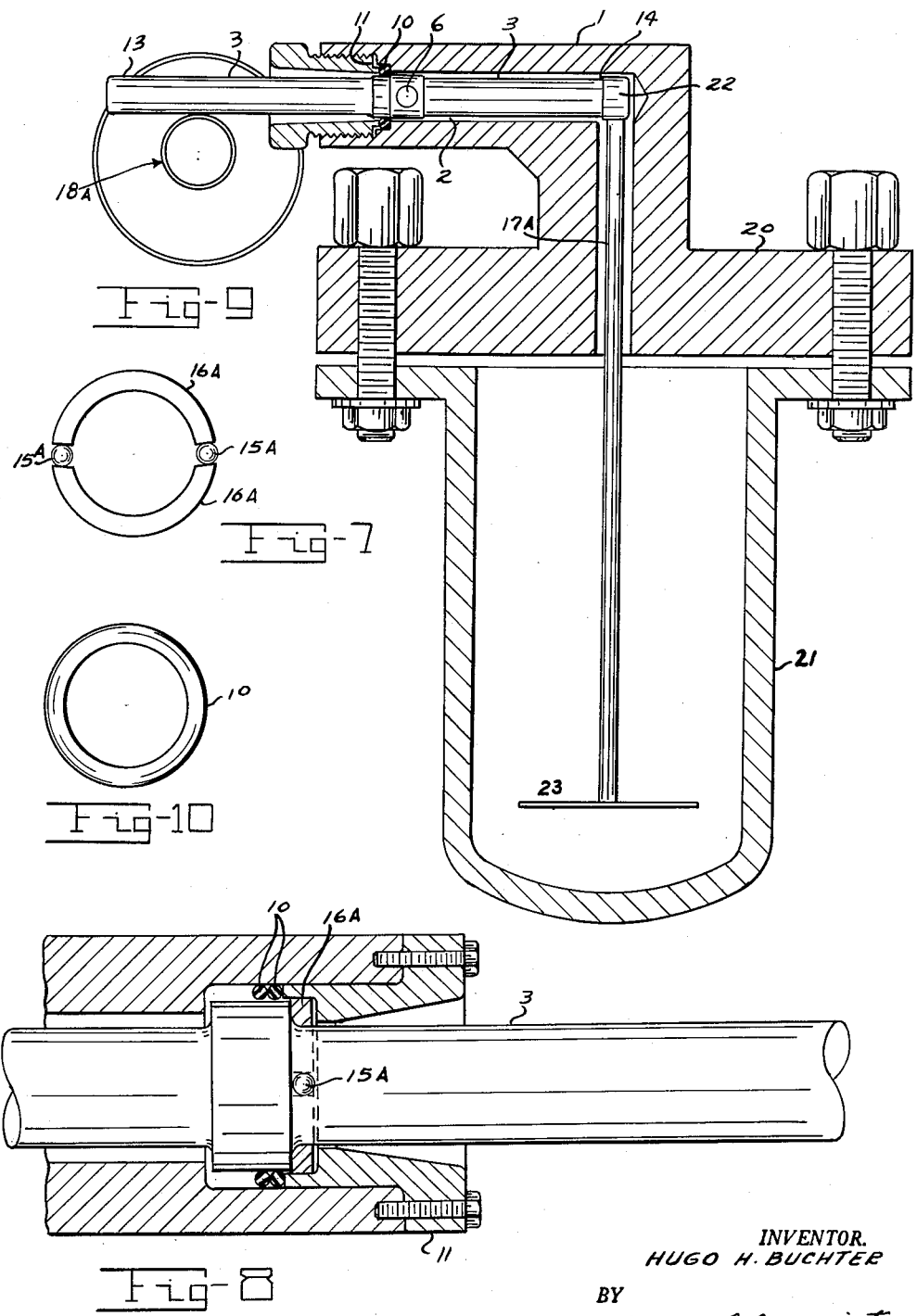

INVENTOR.
HUGO H. BUCHTER
BY
ATTORNEY

United States Patent Office 2,977,140
Patented Mar. 28, 1961

2,977,140

SEAL FOR AGITATORS IN PRESSURE VESSELS

Hugo H. Buchter, Dayton, Ohio, assignor to Monsanto Chemical Company, St. Louis, Mo., a corporation of Delaware Filed June 14, 1957, Ser. No. 665,783

2 Claims. (Cl. 286—15)

This invention relates to mechanical seals for agitators employed in pressure and high vacuum vessels and particularly relates to mechanical seals for use in connection with vibratory agitators.

The seals which have been used in the past on high pressure vessels are difficult to keep tight and leak-proof, and require extensive and continuing maintenance. This maintenance consists of expensive replacement or renewal of packing materials and shafts which have become abraded by the packing.

The seals formerly used become further complicated at high pressures in that they require a pressure lubricating system and in many cases a cooling system to remove frictional heat. These seals are wasteful of power, as in many cases most of the power used goes into friction in the seal. This in turn causes overheating and wear.

While the mechanical problems involved in constructing seals for rotary and reciprocating shaft agitators in pressure vessels are mechanically simple and straight forward, the use of high frequency oscillating or vibratory agitators in pressure vessels has, up to now, presented insuperable problems. For many types of high pressure reactions the use of the high frequency, small amplitude oscillating or vibratory agitator is highly desirable, yet the lack of suitable sealing means has rendered these devices impractical or has restricted their use to relatively low pressures.

Accordingly, an object of this invention is to provide sealing means for a high frequency, small amplitude oscillating agitator which may be used in high pressure or high vacuum vessels. A further object of this invention is to provide a sealing means for a high frequency, small amplitude oscillating agitator which is simple in construction, in operation requires only a minimum amount of energy and which incorporates a readily available resilient elastic type of packing element.

A further object is to provide a novel sealing means for a high frequency mechanical agitator embodying an O-ring of dense solid rubber or rubber composition, which works or kneads the composition so as to keep it alive and pliable.

Further objects and advantages will become evident as the description proceeds.

In accordance with my invention I provide a suitable hollow metallic housing, an oscillatable or vibratory lever pivoted therein by means of a suitable fulcrum and adapted to oscillate at small amplitude about said fulcrum within said housing, the lever being provided with an area of generally circular cross section and in contact with said circular section I provide an elastic resilient packing element of normally circular cross section, which packing element makes contact also with the interior of said housing. A follower or gland element contacting the packing element is arranged to retain the said element in place.

In an actual test of the present seal I have found it possible to transmit oscillations from an oscillating mechanism through the present seal, the frequency of oscillations being at approximately 3500 cycles per minute, while withstanding a continuous gas pressure of 35,000 p.s.i.

The vibratory seal of my invention provides a sealing member which is not subjected to a rotary or twisting motion, being merely compressed a few thousandths of an inch. Thus, the seal is not subjected to rapid wear and frictional heat buildup, and is not power-consuming.

As the seal is subject to a very slight motion, it is practically a static seal and can be used at much higher pressures than conventional seals. The pressure limit is imposed only by the strength of the pressure resisting parts and not by friction or leakage past the seal. The maintenance costs are very low compared to other types of high pressure seals because of the simplicity, material and time of replacement.

For a further understanding of the present invention, reference is made to the accompanying drawings forming a part of the description and wherein like numerals are employed to designate like parts throughout the several views.

Fig. 1 is a longitudinal section of the device employing a circular pin as the fulcrum about which the lever oscillates.

Fig. 2 is a cross sectional view of the device shown in Fig. 1, taken along the line A—A, this view showing means for inserting and retaining the pin fulcrum in the device.

Fig. 3 is a cross sectional view of another embodiment of my invention in which a pin-type fulcrum is employed, but which avoids the external openings in the lever housing element. This embodiment also provides the O-ring on the pressure side of the fulcrum which is an advantage in lubricating the fulcrum.

Fig. 4 is a cross sectional view of another embodiment in which the pin fulcrum is carried in a separate removable member.

Fig. 5 is a cross sectional view of the separate removable member carrying the pin fulcrum as shown in Fig. 4.

Fig. 6 is a cross sectional view of another embodiment which employs a ball-bearing fulcrum in place of the cylindrical pin.

Fig. 7 is a view of the semi-circular retaining rings for positioning the ball fulcrum employed in Fig. 6.

Fig. 8 shows in section the arrangement of the ball fulcrum, this view being taken at right angles to that shown in Fig. 6.

Fig. 9 shows a general layout of a pressure vessel containing an oscillating agitator employing the sealing arrangement of the present invention.

Fig. 10 shows a resilient packing ring.

Figure 11:
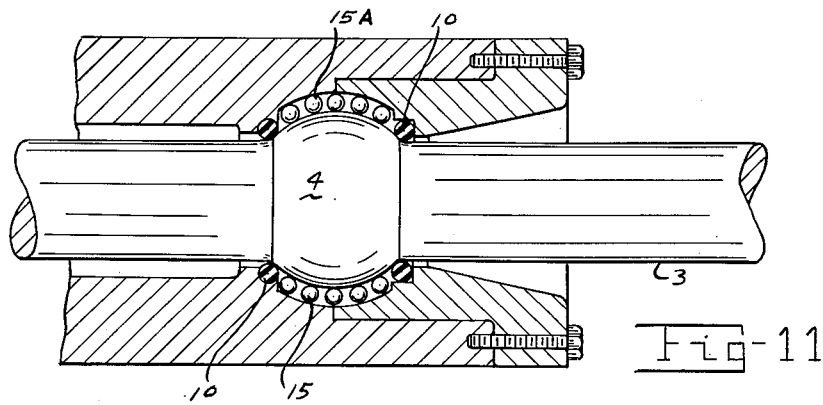
Fig. 11 shows a cross sectional view of an embodiment which employs a ball-bearing rotating system secured by O-rings.

Fig. 1 shows in longitudinal section one embodiment of my invention in which numeral 1 represents a portion of the housing or body member, the same having a center opening or passageway 2 therethrough within which I provide oscillatably mounted lever 3. This lever 3 is provided with shoulders 4 and 5, these being of substantially circular cross section and of somewhat increased diameter as compared with the lever diameter, such shoulders ameter however being sufficiently smaller than the size of opening 2 in the housing 1 so as to permit free oscillation of the lever about a center 6. Coinciding with this center, I provide pin 7 extending completely through the lever at the enlarged shoulder portion 4 and also into openings 8—8 (Fig. 2), the walls of these openings thus providing bearing surfaces for the pin 7. The pin 7 is retained in place in the housing by means of suitable cap screws 9—9.

It will, of course, be understood by those skilled in the art that the metallic parts of my device will be constructed of suitable metals or alloys having a strength adequate to withstand the working pressure to which the device will be subjected in use.

Shoulder 5 on lever 3 carries the resilient elastic solid section packing ring 10, commonly referred to as an O-ring, and for the purpose of retaining the same, shoulder 5 is made slightly larger than is the internal diameter of the O-ring so as to somewhat stretch the O-ring when it is positioned on the shoulder 5. In order to retain the O-ring in place after assembly and when pressurized, a follower or gland 11 is threaded into the housing of body 1. This follower carries a projecting ring 12 against which the O-ring abuts, the internal opening of the follower being also sufficiently large so as to permit free oscillation of the lever 2.

It will be understood, as will be explained in more detail later, that the outboard end 13 of the lever 3 is actuated by a mechanical oscillator at a high rate of speed and that the motion so generated is transmitted by the lever to the inboard end 14 of the lever, this inboard end being directly coupled to the agitator and, accordingly, will transmit its motion thereto. It will, of course, be obvious that the oscillatory motion of the lever will be in a plane at right angles to the axis of the pin 7 as shown by arrows 15—15. The amplitude of oscillation of the lever will desirably be rather low, usually less than about 10° of arc, while the velocity of oscillation will be high, that is, generally from several hundred to several thousand cycles per minute. The effectiveness of agitation of the agitator driven by the present device depends primarily upon the rapidity of the oscillation rather than upon the amplitude thereof.

When fluid pressure is applied to the interior of the reaction vessel to which the agitator and seal have been applied, O-ring 10 will be forced against abutment 12 of follower 11, against the circular shoulder and also against the circular interior surface of housing 1. By reason of the elasticity and resiliency of the material of which the O-ring is constructed, the same will be expanded both outwardly and inwardly, thus effectively sealing the crevices adjacent the lever shoulder and housing surfaces against leakage. At the same time the oscillatory motion of the lever will not be impeded by pressure exerted by the O-ring since such pressure is uniformly exerted over the entire circumference of the shoulder 5. Indeed, it has been found that there is very little difference in the amount of energy required to oscillate the lever whether or not high pressure is exerted against the device.

During operation of the lever 3, the O-ring will be seen to undergo a slight kneading action because of the fact that the surface of shoulder 5 in contact with the ring undergoes a slight, but continuous, oscillation, the effect of which is to increase the life and elasticity of the resilient material of which the ring is constructed.

The inboard end of the housing 1 as represented by the surface 16 may be attached either directly to the wall of the pressure vessel which contains the agitator or it may form part of an elbow attached to the pressure vessel. See Figure 9.

In the embodiment shown in Fig. 3, numeral 1 again represents the body or housing of the device, 2 represents the opening in which lever 3 oscillates, 5 the enlarged shoulder of circular cross-section on lever 3, thus providing a circular bearing surface against which O-ring 10 seats itself. Lever 3 oscillates about the center 6 of pin 7. Gland or follower member 11, held in place by screws 16A or other suitable means, is provided with shoulder 17 abutting the surface of pin 7, thus holding the same firmly against the shoulder 8 of the housing.

Upon application of pressure to the autoclave, of which housing 1 forms a part, O-ring 10 will be forced securely against both the circular shoulder 5 of lever 3 and the cylindrical interior surface 18 adjacent shoulder 5. At the same time lever 3 will be free to oscillate as already described.

In the embodiment of the invention which is shown in Fig. 4, the pin-type fulcrum 7 is journalled in the follower element 11, thus avoiding the necessity for an external opening in the housing member 1. In Fig. 4 the pin 7 is secured in a passageway 12 which passes through the follower element 11. The O-ring 10 then holds the internal pressure by making a seal between the follower element 11 and the circular cross-section of the shaft of the lever 3. In this embodiment of the invention the follower is provided with a lens-ring 13 at the outboard end of the follower 11. This lens-ring is held in place by a head or bonnet 14. The head is held securely against the housing by conventional means such as bolts in order to seal the lens-ring 13 against the body of the reactor housing 1. Fig. 5 shows in greater detail the follower element 11 with the lens-ring 13 and the journal openings 12.

Figs. 6 and 8 show an embodiment in which two diametrically arranged ball-bearings 15—15 are provided and so located as to serve as a fulcrum upon which lever 3 oscillates. The ball-bearings are maintained in opposed relationship by means of the partial semi-circular metallic rings 16, as shown in more detail in Fig. 7. These circular rings are made somewhat thinner than the diameter of the balls so as to permit oscillation of lever 3 after the device has been assembled in the housing 1. Lever 3 is provided with an enlarged circular section of shoulder 5, the flat or end surface of which contacts and pivots upon the ball-bearings. Two O-rings 10, are shown being carried upon the cylindrical surface of shoulder 5, which again is made somewhat larger than the normal inside diameter of the O-rings. This design permits a number of such O-rings to be employed. A gland or follower 11 positively bears against the ball-bearings, at points 7—7 (Fig. 6). The gland or follower 11 also carries a projection ring 12 against which the inside O-ring abuts.

Upon application of pressure to the device the O-rings are forced towards and against abutment 12, deformed slightly and thus pressed tightly against the cylindrical surface of shoulder 5 and likewise against the internal cylindrical surface 2 of the housing 1, thus forming the seal.

By means of this construction the fulcrum means being on the low pressure side of the seal is accessible for lubrication, should this be desirable.

It will be understood that the ball-bearings 15—15 shown in Figs. 6, 7 and 8 may be replaced by cylindrical roller elements such as are employed in conventional roller bearings.

Fig. 9 shows a conventional use of the present invention when applied to drive an oscillatory agitator in a pressure vessel. In this sectional view, numeral 1 represents the housing which is either part of or attached to closure 20 of pressure vessel 21. Numeral 3 indicates the oscillatory lever pivoted at 6 and provided with O-ring 10 and gland 11, as shown in greater detail in Fig. 1. The outboard end 13 of lever 3 is oscillated by eccentric cam 18A or by any other suitable means. An inboard end 14 of lever 3 is joined to agitator shaft 17A by any suitable coupling, shown at 22.

It will be understood that rapid oscillation imparted to lever 3 by means of cam 18A will be transmitted through coupling 22 to shaft 17A and thence to agitator disc 23.

Fig. 10 shows an O-ring which is formed of elastic solid rubber or other suitable resilient material as employed in the embodiments shown in the figures where it is designated uniformly by numeral 10. The O-ring may also be made of plastic or elastomeric materials such as polytetrafluoro ethylene or other polymers of fluoro carbons and fluorochloro carbons.

Fig. 11 illustrates another embodiment of the invention in which the angular oscillatory motion is provided by a plurality of ball-bearings 15A which are located in a plane which coincides with the axis of rotation of the lever arm 3. The planar set of ball-bearings is held in place by a slightly smaller pair of half-spheres located on the two sides of the said plane of the ball-bearings. In this embodiment the shoulder 4 of shaft 3 is spherical in shape. It is desirable in this instance to use a pair of O-rings 10 both at the inboard sides of the sealing system to hold the ball-bearings in place as well as to seal the pressure within the vessel.

Figure 12:
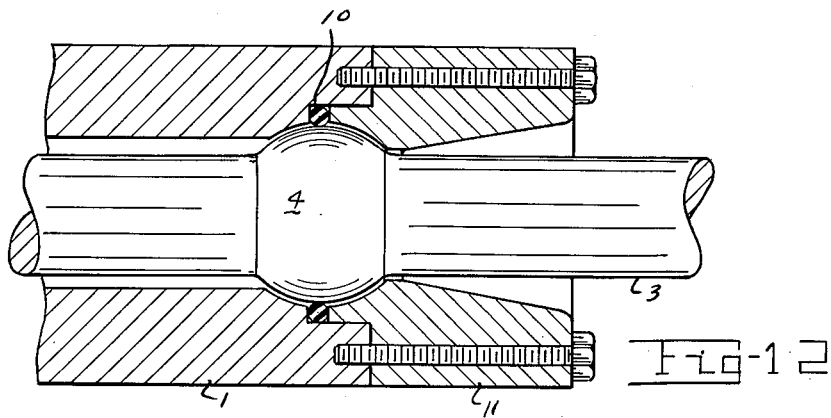
Fig. 12 shows a cross sectional view of another embodiment in which a spherical bearing surface subjected to oscillatory angular motion is secured by an O-ring. This type is particularly effective for use with high vacuum systems.

Fig. 12 shows another embodiment of the invention in which a spherical shoulder is used. This modification avoids the necessity for the ball-bearing system of Fig. 11, and instead permits the spherical shoulder 4 to revolve in a small angle within similar spherical openings provided in housing 1 and follower 11. It is an advantage of this embodiment of the invention that the O-ring 10 is located in a plane which contains the center of rotation of the lever 3, thus minimizing the motion to be absorbed by the said O-ring.

Figure 13:
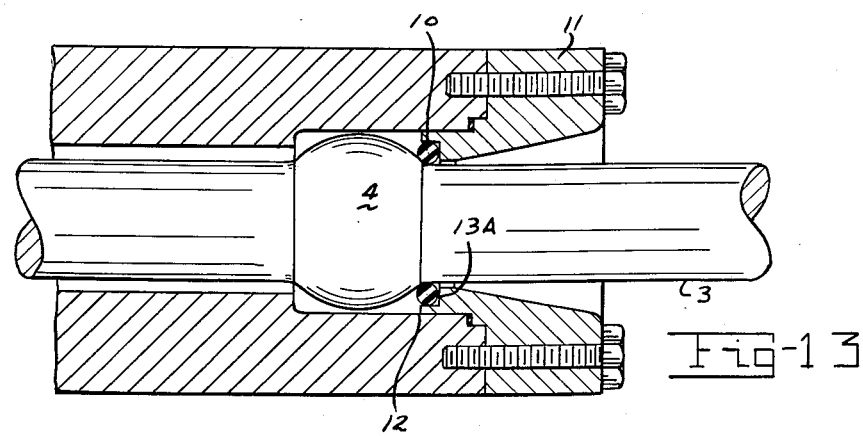
Fig. 13 shows a cross sectional view of an embodiment of the invention in which an O-ring serves both as a sealing means and as the fulcrum about which angular oscillation takes place.

Fig. 13 illustrates another embodiment of the invention in which the O-ring serves the dual purpose of sealing member and fulcrum member. In this figure, lever 3 is provided with a circular shoulder 5, an O-ring 10 being placed in contact with the flat surface of shoulder 4. A gland or follower 11 is provided with a projecting shoulder 12 and a recess 13A, the contour of said recess only partly surrounding O-ring 10. The design of this embodiment is such as to maintain during operation a substantial distance between the flat surface of shoulder 4 and the front end 12 of gland 11, so as to obviate contact of these surfaces during oscillation of the lever 3. The maintenance of a sufficient distance at this point is accomplished by employing an O-ring of sufficiently large cross-sectional area in connection with the recess 13A so that even after compression of the O-ring caused by the pressure within the autoclave has taken place, lever 3 remains free to oscillate.

What I claim is:
1. A seal for an oscillatory lever comprising a housing having an abutment in the interior thereof, an oscillatable lever extending through said housing to an outboard end, fulcrum means comprising a pin extending through the said oscillatable lever, the fulcrum means being positioned in bearing means within said housing so as to permit oscillation of said lever, the said lever having an enlarged integral section around the fulcrum means, which enlarged section has a necked-down portion of concave surface, reducing to a cylindrical surface of smaller diameter than the aforesaid enlarged integral section, the said cylindrical surface being located on the outboard side of said lever and providing a sealing surface, resilient sealing means of normally circular cross section, being adapted and arranged to contact the aforesaid cylindrical sealing surface adjacent to the said fulcrum and also to contact the said abutment in the interior of the said housing to form a pressure tight seal, and securing means confining the said resilient sealing means against the housing at the necked-down portion of the outboard end of the said lever, the securing means having an internal opening sufficiently large so as to permit free oscillation of the said lever therein.

2. A seal for an oscillatory lever comprising a housing, an oscillatable lever extending through said housing to an outboard end, fulcrum means comprising a pin extending through the said oscillatable lever, the fulcrum means being positioned in bearing means within said housing so as to permit oscillation of said lever, the said lever having an enlarged integral section around the fulcrum means, which enlarged section has a necked-down portion of concave surface, reducing to a cylindrical surface of smaller diameter than the aforesaid enlarged integral section, the said cylindrical surface being located on the outboard side of said lever and providing a sealing surface, resilient sealing means of normally circular cross section, being adapted and arranged to contact the aforesaid cylindrical sealing surface at the interior of the said housing and adjacent to the said fulcrum means to form a pressure tight seal, and securing means confining the said resilient means against the housing at the necked-down portion of the outboard end of the said lever, the securing means having an internal opening sufficiently large so as to permit free oscillation of the said lever therein.

References Cited in the file of this patent

UNITED STATES PATENTS

| | | |
|---|---|---|
| 343,769 | Levi | June 15, 1886 |
| 1,181,143 | Korfhage | May 2, 1916 |
| 1,237,880 | Drake | Aug. 21, 1917 |
| 1,583,291 | Hawley | May 4, 1926 |
| 2,151,356 | Queen | Mar. 21, 1939 |
| 2,365,649 | Shaw | Dec. 19, 1944 |
| 2,490,333 | Basham | Dec. 6, 1949 |
| 2,564,938 | Warren | Aug. 21, 1951 |
| 2,712,968 | Reese | July 12, 1955 |
| 2,757,053 | Green | July 31, 1956 |
| 2,778,598 | Bolling | Jan. 22, 1957 |
| 2,795,667 | Schwerke | June 11, 1957 |

FOREIGN PATENTS

| | | |
|---|---|---|
| 1,006,417 | France | Jan. 23, 1952 |